Oct. 10, 1939.　　　G. LAUBENSTEIN　　　2,175,992
REINFORCED HANDBAG FRAME
Filed June 15, 1938
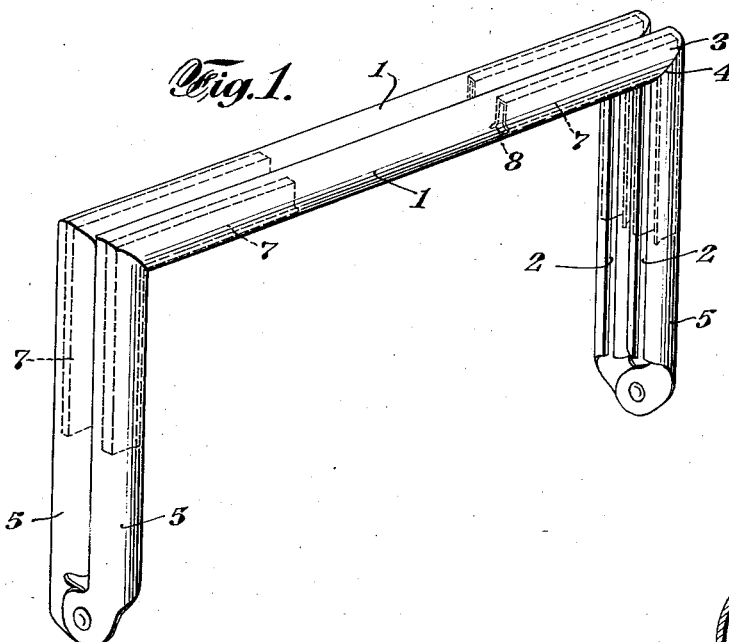
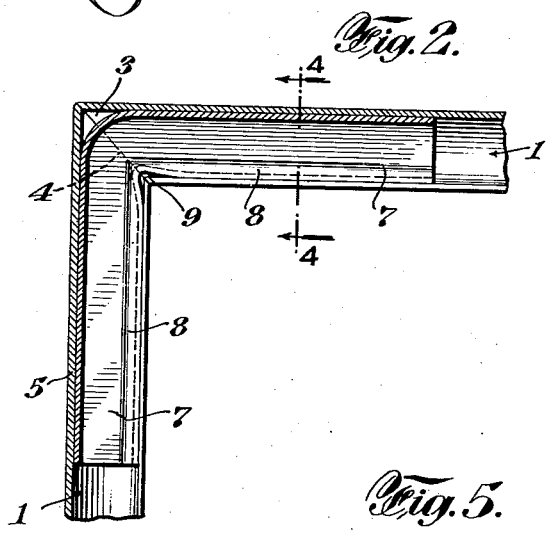
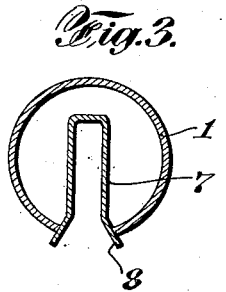
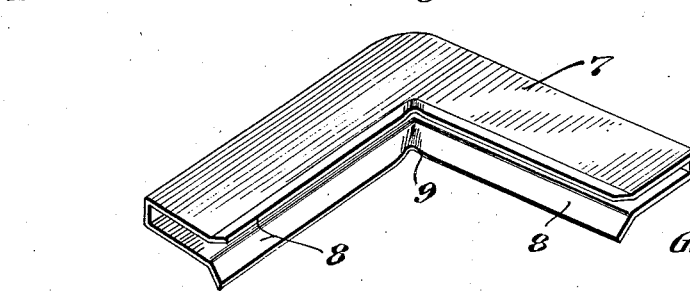
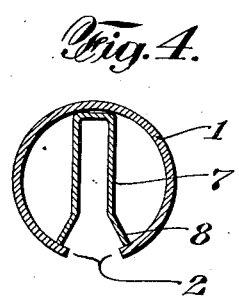
INVENTOR
George Laubenstein
BY
ATTORNEYS.

Patented Oct. 10, 1939

2,175,992

UNITED STATES PATENT OFFICE 2,175,992

REINFORCED HANDBAG FRAME

George Laubenstein, Madison, N. J., assignor to The J. E. Mergott Company, Newark, N. J., a corporation of Delaware Application June 15, 1938, Serial No. 213,741

6 Claims. (Cl. 150—29)

This invention relates to improvements in handbag or purse frames, particularly of the type having mitre joints.

The object of the invention is to provide in such a frame a novel means for securing the said mitre joints and reinforcing them whereby there is produced a frame which is strong and durable and not subject to distortion and, moreover, simple and inexpensive to manufacture.

Heretofore it has been the standard practice, in order to make a mitre joint frame secure, to solder or weld the joints. However, this has been a most expensive operation because each of several mitre joints have had to have been individually so treated for each complete frame. An outstanding advantage, therefore, of the reinforcing means of this invention lies in its making unnecessary the costly soldering or welding of the prior practice. Also there is the attendant advantage that a neater and firmer joint is obtained.

The invention will be best understood by reference to the accompanying drawing, showing the preferred form of the purse frame construction, in which Fig. 1 is a perspective view of the handbag frame showing the mitre joint reinforcing elements in dotted lines;

Fig. 2 is a cross-section view in elevation of a portion of one of the pair of frame members with its mitre joint reinforcing element;

Fig. 3 is a cross-section view of one of the frame members and a reinforcing element which has yet to be pressed into position within the frame member.

Fig. 4 is a cross-section view similar to that of Fig. 3 except that the reinforcing element has been pressed into position. This view is taken on line 4—4 of Fig. 2.

Fig. 5 is a perspective view of one of the reinforcing elements.

Referring to Fig. 1 of the drawing, it will be seen that the complete handbag frame is comprised of a pair of members each of which, as here shown, is in the form of a tube 1, having a longitudinal slot 2, cut and bent to make corners 3 which form mitre joints 4. Each frame member thus has the main body portion 1 and two leg portions 5 which are hinged at their lower ends 6 to the leg ends of the other member. As the frame members are hollow, the material of the handbag may be inserted through the slots 2 and clamped in said members.

In Fig. 5 is shown the mitre joint securing or reinforcing element 7 which is made by bending a channel-shaped piece of steel or other suitable metal or material at an angle corresponding to the angle of the mitre joint, here shown as a right angle, and flaring or tapering outwardly along its outer edges 8. The irregular curvature at the corners formed by the flared-edges, as at 9 (see Figs. 2 and 5) is the result of the bending process.

The complete reinforcing element 7 is then inserted in the slot 2 of the frame member. It will occupy the position shown in Fig. 3, that is partially within the frame member, with its outwardly flanged edges 8 in contact with the edges of slot 2. The element 7 is then pressed or snapped into the corner 3 of the mitre joint 4. This will result in element 7 occupying a position completely within the frame member with the closed end in contact with upper portion of the wall of said member and its flanged edges 8 pressing firmly against the lower portion of said wall on either side of slot 2, as shown in Figs. 2 and 4. It will be apparent that the flanged edges 8 of reinforcing element 7 because of the natural resiliency of the material thereof, hold the said element 7 securely in place preventing its becoming dislodged. It will be understood that one of the elements 7 is thus inserted at each mitre joint of each frame member, as shown in Fig. 1. As the reinforcing element is of channel shape, it presents a space between its walls to receive the material of the handbag.

From the above description, considered in connection with the accompanying drawing, it will be seen that in this invention is provided a new means, comprising a strong integral element, which may be simply and quickly made and readily inserted in a mitre joint frame to produce effective and secure closure and reenforcement of the mitre joints without the use of solder or other extraneous means and that the mitred corners are protected from distortion in any way. However, the reinforcement could be secured in position by welding, soldering or lugging.

While the invention has been described in connection with the specific construction in the drawing, it is obvious that changes in construction, form, arrangements and materials may be made without departing from the scope of my invention. Thus, for instance, the reinforcing element may be used in a mitre frame whose members have a channeled form with restricted opening rather than that of a slotted tube, and the parts could be made and assembled in a straight form and then bent at one time. Also, the frame members and reinforcing element may be made of suitable materials other than steel or other metal.

Indeed, it is an advantage of this invention, making unnecessary the use of solder or rivets, that such other materials may be used. Therefore, I do not wish to be limited to the precise details of the construction set forth, but desire to avail myself of such variations and modifications as come within the scope of the appended claims.

I claim:

1. In combination, a hollow frame member for handbags and the like to receive and clamp the material of the handbag and having a mitre joint and a restricted opening lengthwise of said joint, and a reinforcing element for said joint bodily shiftable into the joint through said opening and so admeasured as to be completely concealed therein, said element being of a form to receive the material of the handbag and including expansible means internally gripping the hollow member, and holding said element within the joint.

2. In combination, a hollow frame member for handbags and the like having a mitre joint and a restricted opening lengthwise of said joint, and an angular reinforcing element bodily shiftable into the joint through said opening and so admeasured as to be completely concealed therein and including resilient side portions expansible in the hollow of said frame member and presenting between them a space to receive material of the handbag, said side portions internally engaging the frame member at a plurality of points, for holding the said element within the joint.

3. In combination, a hollow frame member for handbags and the like having a mitre joint and a restricted opening lengthwise of said joint, and a reinforcing element of angular form and of channel-shaped cross section for bodily movement through said opening into the joint, the side portions of said channel-shaped element having flaring edge portions contractable in their passage through the opening and expansible within the hollow of said frame member for gripping the walls thereof and holding said element within the frame member at the mitre joint.

4. A reinforcing element for the frame joints of handbags, consisting of an angular body having a channel-shaped cross section, the side walls of which are provided with outwardly flaring resilient terminal edge portions longitudinally thereof.

5. In combination, a handbag frame member formed of a longitudinally slotted tube and provided with mitre joints, and means for reinforcing and securing said mitre joints comprising channel-shaped elements bent at right angles and including resilient side members having their outer edge portions outwardly flared, said elements being inserted within the frame at said joints through said slot and retained within the tube by their flared edges springing out to engage the wall of the tube on opposite sides of said slot.

6. In combination, a hollow channel-shaped frame member bent to form a corner angle and having a slot extending lengthwise with respect to said corner angle, a reinforcing member with a body of channel-shaped cross section and formed at an angle corresponding to said corner angle and having its side walls formed to provide outwardly flaring edge portions, the body of said reinforcing member being of such size and shape as to pass through said slot into said frame member, and one of said members being resilient so that after the reinforcing member is entered through said slot into said frame member the flaring edge portions of the reinforcing member will engage the inner surface of the frame on opposite sides of said slot and securely brace and hold the members together.

GEORGE LAUBENSTEIN.